(12) United States Patent
Van Hende

(10) Patent No.: US 8,655,591 B2
(45) Date of Patent: *Feb. 18, 2014

(54) METHOD OF CREATING VARIED EXERCISE ROUTES FOR A USER

(75) Inventor: Iwan Van Hende, Tao-Yuan Hsien (TW)

(73) Assignee: Mitac International Corp., Kuei-Shan Hsiang, Tao-Yuan Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/467,051

(22) Filed: May 9, 2012

(65) Prior Publication Data

US 2013/0304377 A1 Nov. 14, 2013

(51) Int. Cl.
*G01C 21/34* (2006.01)
(52) U.S. Cl.
USPC .......................................... 701/533; 701/426
(58) Field of Classification Search
USPC .................................... 701/533, 426
See application file for complete search history.

(56) References Cited

U.S. PATENT DOCUMENTS

| 2001/0025222 | A1* | 9/2001 | Bechtolsheim et al. | 701/209 |
|---|---|---|---|---|
| 2007/0156335 | A1* | 7/2007 | McBride et al. | 701/209 |
| 2008/0009275 | A1 | 1/2008 | Werner | |
| 2010/0088023 | A1* | 4/2010 | Werner | 701/206 |
| 2012/0101717 | A1 | 4/2012 | Zhang | |

FOREIGN PATENT DOCUMENTS

| EP | 2 172 249 A2 | 4/2010 |
|---|---|---|
| EP | 2 172 249 A3 | 9/2010 |

OTHER PUBLICATIONS

Van Hende, Title of Invention: Method of creating exercise routes for a user and related personal navigation device, U.S. Appl. No. 13/461,789, filed May 2, 2012.

* cited by examiner

*Primary Examiner* — Mary Cheung
*Assistant Examiner* — Yuen Wong
(74) *Attorney, Agent, or Firm* — Winston Hsu; Scott Margo

(57) ABSTRACT

A method of creating an exercise route for a user of a personal navigation device includes receiving a selection of a length of an exercise route to be generated, and generating a first plurality of suggested exercise routes, each suggested exercise route of the first plurality of suggested exercise routes being generated according to a current position of the personal navigation device, one or more waypoints to be visited along the suggested exercise route, and the selected length of the exercise route, wherein each of the first plurality of suggested exercise routes has a starting point and ending point substantially equal to one another and equal to the current position of the personal navigation device. The method further includes receiving, from the user, selection of a selected suggested exercise route from the first plurality of suggested exercise routes, and displaying routing instructions for the selected suggested exercise route.

18 Claims, 13 Drawing Sheets

Terrain preferences

☐ Walking
☐ Running
☐ Off-road cycling
☐ Road cycling
☐ Wheelchair accessible

FIG. 3

Detailed terrain preferences

☐ Hilly
☐ Flat
☐ Urban
☐ Green belt / natural
☐ Stairs
☐ Beach
☐ Nearby parking
☐ Difficulty

FIG. 4

Input route parameter preferences

- ☑ 202 Difficulty level (1-5); Elevation gain
- ☑ 204 Exercise type : walking, running, cycling, mountain biking
- ☐ 206 Point(s) of interest
- ☑ 208 Total distance
- ☑ 210 Starting and/or ending point
- ☐ 212 Training program
- ☐ 214 Calories burned
- ☐ 215 Heart rate
- ☐ 216 Direction of route

METHOD OF CREATING VARIED EXERCISE ROUTES FOR A USER

BACKGROUND OF THE INVENTION

1. Field of the Invention

The invention relates to a personal navigation device, and more particularly, to a personal navigation device that automatically creates a variety of sets of suggested exercise routes for the user to select from.

2. Description of the Prior Art

Global Positioning System (GPS) based navigation devices are well known and are widely employed as in-car navigation devices. Common functions of a navigation device include providing a map database for generating navigation instructions that are then shown on a display of the navigation device. These navigation devices are often mounted on or in the dashboard of a vehicle using a suction mount or other mounting means.

The term "navigation device" refers to a device that enables a user to navigate to a pre-defined destination. The device may have an internal system for receiving location data, such as a GPS receiver, or may merely be connectable to a receiver that can receive location data. The device may compute a route itself, or communicate with a remote server that computes the route and provides navigation information to the device, or a hybrid device in which the device itself and a remote server both play a role in the route computation process. Portable GPS navigation devices are not permanently integrated into a vehicle but instead are devices that can readily be mounted in or otherwise used inside a vehicle. Generally (but not necessarily), they are fully self-contained—i.e. include an internal GPS antenna, navigation software and maps and can hence plot and display a route to be taken.

Currently, personal navigation devices used for outdoor activities such as hiking, jogging, or cycling are limited in their options presented to users. Route planning with conventional personal navigation devices is performed by the user entering a starting point, an ending point, and possibly a waypoint, with the personal navigation devices creating a planned route for the user based on these criteria. However, this requires the user to enter these locations manually, which requires extra time from the user that could instead be spent exercising.

Unlike when driving a vehicle, when exercising, the user is not usually interested in merely getting from point A to point B as quickly as possible. Unfortunately, when creating a route between point A and point B, conventional personal navigation devices always provide the same route and do not offer any alternatives. Thus, the user may get tired of exercising on the same route every time. Furthermore, sports-based personal navigation devices do not always provide any personalized routes based on specific user requirements or existing training programs followed by the user.

SUMMARY OF THE INVENTION

It is therefore one of the primary objectives of the claimed invention to provide a method of creating a plurality of suggested exercise routes for the user to select from in order to provide a more enjoyable and varied exercise experience.

According to an exemplary embodiment of the claimed invention, a method of creating an exercise route for a user of a personal navigation device is disclosed. The method includes storing a database in a memory of the personal navigation device, the database including geographic data, receiving a selection of a length of an exercise route to be generated, and generating a first plurality of suggested exercise routes, each suggested exercise route of the first plurality of suggested exercise routes being generated according to a current position of the personal navigation device, one or more waypoints to be visited along the suggested exercise route, and the selected length of the exercise route, wherein each of the first plurality of suggested exercise routes has a starting point and ending point substantially equal to one another and equal to the current position of the personal navigation device. The method further includes displaying the first plurality of suggested exercise routes to the user on a display of the personal navigation device, receiving, from the user, selection of a selected suggested exercise route from the first plurality of suggested exercise routes, and displaying routing instructions on the display of the personal navigation device for the selected suggested exercise route.

It is an advantage that the present invention method automatically creates a plurality of suggested exercise routes for the user to select from in order to provide a more enjoyable and varied exercise experience for the user. The plurality of suggested exercise routes can be automatically created for the user based on the user's current location and the length of the exercise route specified by the user. In this way, the user does not need to manually create an exercise route, thereby saving time in planning a route. Further, the user can either select one of the plurality of suggested exercise routes, or the user can request generation of another plurality of suggested exercise routes to choose from. As a result, the user can exercise on a greater variety of exercise routes that are enjoyable and challenging, making it more likely that the user will continue exercising for improving fitness. The user also has the option of manually creating preferred exercise routes instead of using the automatically created suggested exercise routes.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 shows terrain preferences that may be selected by the user of the personal navigation device.

FIG. 4 shows detailed terrain preferences that may be selected by the user of the personal navigation device.

FIG. 6 is a screen showing input route parameter preferences selectable by the user.

DETAILED DESCRIPTION

Figure 1:
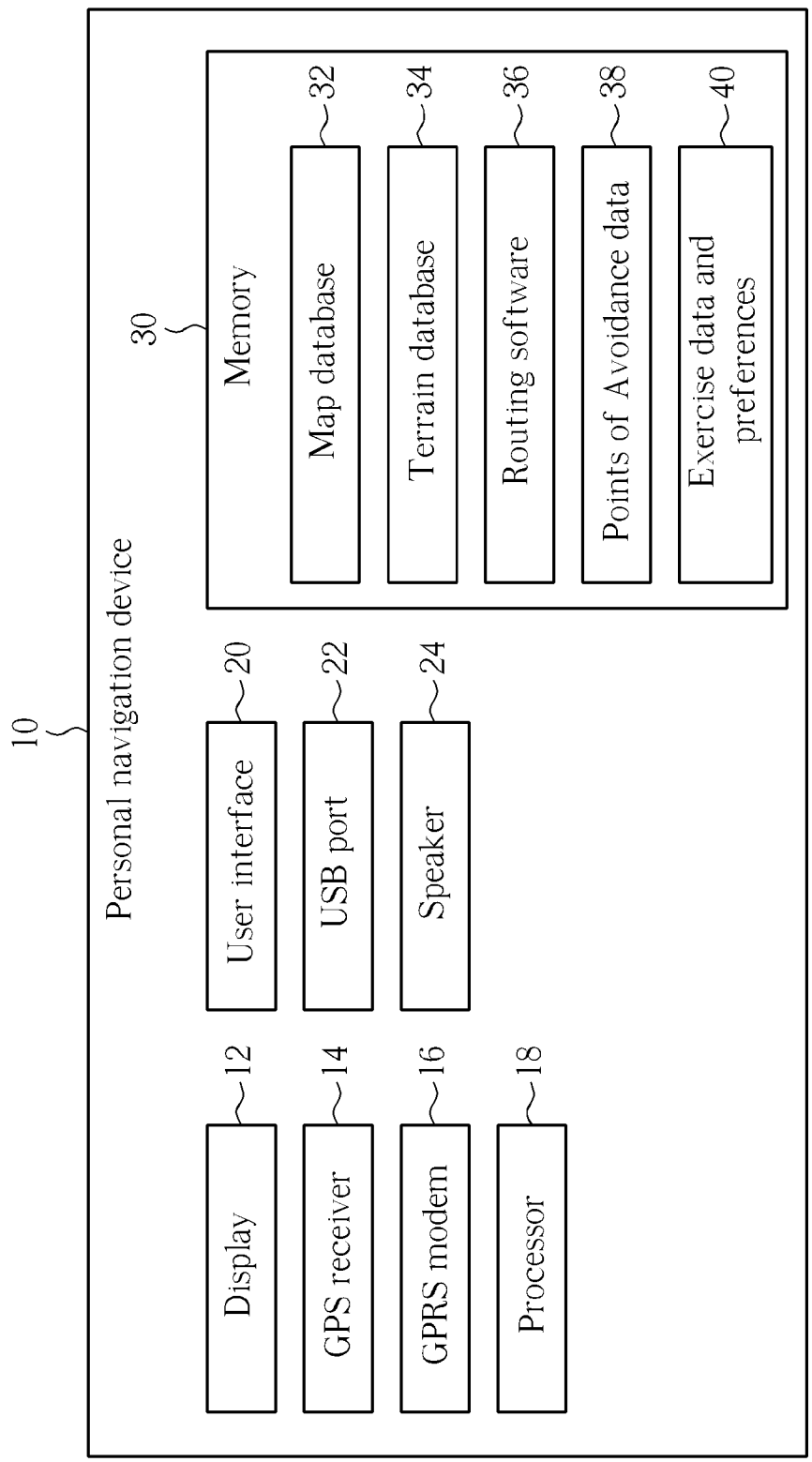
FIG. 1 is a block diagram of a personal navigation device according to the present invention.

Please refer to FIG. 1. FIG. 1 is a block diagram of a personal navigation device 10 according to the present invention. The personal navigation device 10 contains a display 12 which can be a touch sensitive display, a GPS receiver 14 for receiving the current coordinates of the personal navigation device 10, a General Packet Radio Service (GPRS) modem 16 for providing internet access and data connectivity, a processor 18 for controlling operation of the personal navigation device 10, a user interface 20, a Universal Serial Bus (USB) port 22 for allowing data to be exchanged with a computer, a speaker 24, and memory 30. Instead of the speaker 24, a buzzer can also be used to provide audio feedback to the user. The memory 30 is used to store a map database 32 containing map data and points of interest, a terrain database 34 containing terrain information of at least some of the areas covered by the map database 32, and routing software 36. The memory 30 also stores points of avoidance data 38 which contains areas that users may wish to avoid based on historical safety data of that area. The user of the personal navigation device 10 can download updated points of avoidance data 38 through the USB port 22 or through the GPRS modem 16. User data such as exercise data and preferences 40 is also stored in the memory 30 in order to have a record of what training level the user is at, what exercise routes the user prefers, and what length of exercise routes the user prefers. The GPRS modem 16 can also be replaced with other types of modems such as a Bluetooth modem or a Wi-Fi modem in order for allowing the personal navigation device 10 to communicate with other devices. The personal navigation device 10 can also be provided with a camera for allowing the user to take geotagged photographs and to share them with others. Other connectivity options besides the GPRS modem that can be used for data transfer include communication according to the ANT+, Wi-Fi, 3G, or Bluetooth protocols.

Figure 2:
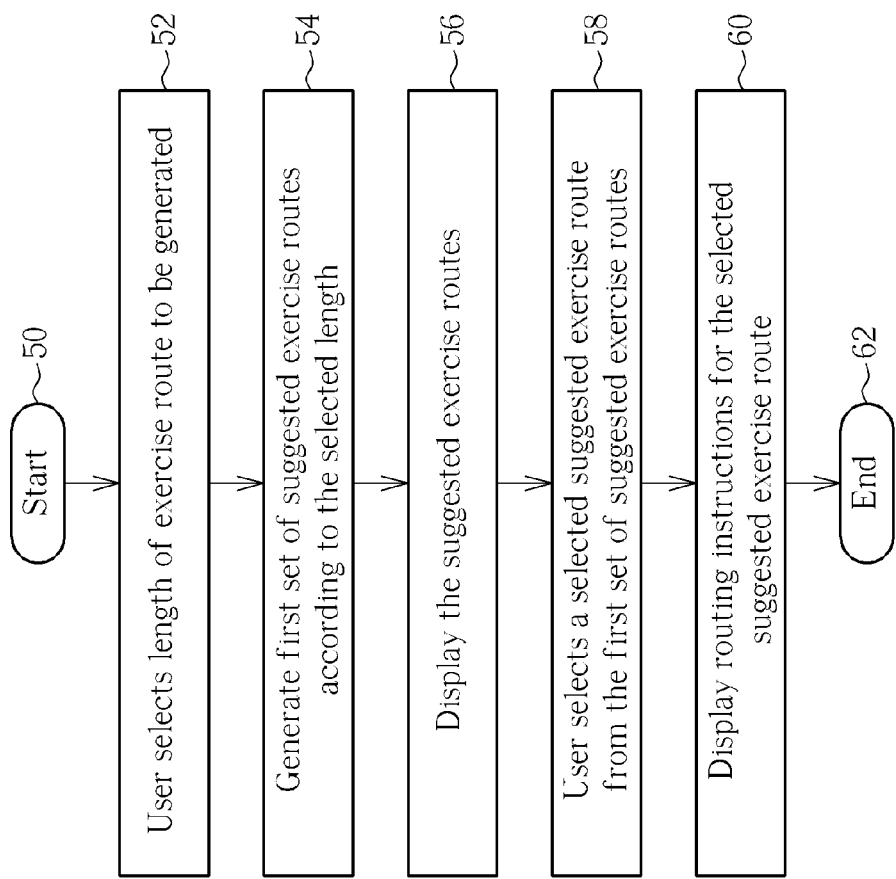
FIG. 2 is a flowchart illustrating a method of creating suggested exercise routes using the personal navigation device according to the present invention.

Please refer to FIG. 2. FIG. 2 is a flowchart illustrating a method of creating suggested exercise routes using the personal navigation device 10 according to the present invention. Steps contained in the flowchart will be explained below.

Step 50: Start.

Step 52: The user indicates a length of the exercise route to be generated. The length can be indicated in distance, or can be indicated in the amount of time that the user would like to exercise. The length can even be expressed in terms of calories burned during the exercise route. If the user specifies a distance for the exercise route, the routing software 36 will generate an exercise route having a total distance approximately equal to the desired distance. If the user specifies an exercise time period, the routing software 36 can then use estimated speed information that may be based on the user's training history for the potential exercise routes in order to find an exercise route that would allow the user to exercise for the desired amount of time. The estimated speed information can be provided by the user, can be read from a history of the user's exercise data, or can be estimated based on other factors such as the difficulty level of the exercise route. The user may ask for a one-way route to be generated, which guides the user from point A to point B, or for a loop route to be generated which guides the user back to the original starting point at the end of the exercise route.

Step 54: The routing software 36 generates a first set of suggested exercise routes. Each of the exercise routes in the first set of suggested exercise routes is generated according to a current position of the personal navigation device, one or more waypoints to be visited along the suggested exercise route, and the selected length of the exercise route. Each exercise route in the first set of suggested exercise routes may have a starting point and an ending point substantially equal to one another and equal to the current position of the personal navigation device. Alternatively, a one-way route can be created in which the ending point is not equal to the starting point.

Step 56: The first set of suggested exercise routes are shown to the user on the display 12.

Step 58: The user selects a selected suggested exercise route from the first set of suggested exercise routes.

Step 60: The routing software 36 provides routing instructions to the user for the selected suggested exercise route. Visual instructions can be given to the user through the display 12. Audio instructions can also be given through the speaker 24, a Bluetooth headset, or through an earphone jack. When users are cycling or walking, they may prefer to hear audio instructions instead of having to stop and glance down at the display 12, so both audio and visual instructions may be given to the user.

Step 62: End.

Please refer to FIG. 3. FIG. 3 shows terrain preferences that may be selected by the user of the personal navigation device 10. These are broad choices indicating the user's mode of transportation that can later be refined depending on the user's selection. The choices include walking routes, running routes, off-road cycling routes, road cycling routes, and wheelchair accessible routes. Other potential terrain possibilities include paved roads or paths, unpaved roads or paths, urban areas, rural areas, avoiding urban areas, and avoiding rural areas.

After an initial choice is made, the user can be given further options. Suppose that the user selected the choice for "Walking" in FIG. 3. More detailed terrain options could then be presented to the user for allowing the user to select what kind of walking route is preferred. Please refer to FIG. 4. FIG. 4 shows detailed terrain preferences that may be selected by the user of the personal navigation device 10. These choices include routes with hilly terrain, routes with flat terrain, routes in urban areas, routes in a greenbelt area or a natural area, routes that have a significant number of stairs (measured as a total number of stairs along the route or as a number of stairs per unit distance), routes along a beach, or routes that have nearby parking. The user may also ask for routes to be generated according to a difficulty level of the route, such as on a difficulty scale of 1 to 5.

Figure 5:
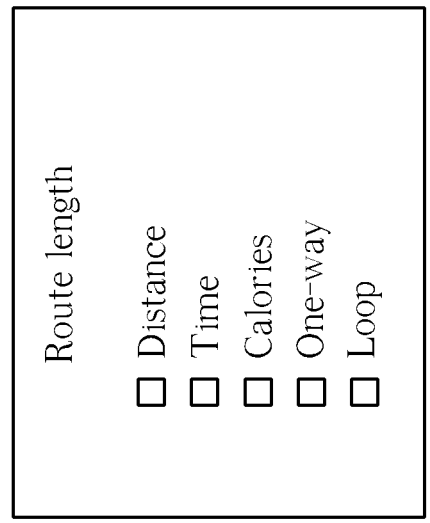
FIG. 5 shows route length preferences that may be selected by the user of the personal navigation device.

After the user has selected a terrain type or difficulty level, the user is given the chance to specify the length of the route and whether the route is a one-way route or a loop route. Please refer to FIG. 5. FIG. 5 shows route length preferences that may be selected by the user of the personal navigation device 10. As stated in the description of step 54 above, the route length can be indicated as a distance, a time, or the amount of calories burned. The user can also specify a one-way route from point A to point B or a loop route starting at point A and finishing at point A. When the user selects a loop route based on a distance selected by the user, the planned loop route might not fit the distance perfectly because the real route cannot be as accurate as an exercise machine. Therefore, the planning for the route preferably allows for a distance error (difference) between the selected distance and the actual distance that the routing software 36 generates. For example, the personal navigation device 10 could notify the user, "The loop route is 5 meters longer than your selection". The user could select "OK" if he accepts. Certainly, the error should be within a predetermined range.

After the user has selected a terrain type or difficulty level and a route length, the routing software 36 consults the map database 32 and the terrain database 34 for generating an exercise route conforming to the user's selections. The generated exercise route may be chosen such that unsafe areas indicated in the points of avoidance data 38 are avoided. Otherwise, if the generated exercise route enters areas that are considered to be unsafe, the personal navigation device 10 can notify the user about these unsafe areas. Similarly, if the generated exercise route will take a user nearby a point of interest that is recorded as being a favorite point of interest of the user, the personal navigation device 10 can notify the user and ask the user if he wishes to include the favorite point of interest in the generated exercise route. The personal navigation device 10 can also inform the user about the added distance and time that will be needed to add this favorite point of interest to the generated exercise route.

If the user decides that he likes the planned exercise route that the routing software 36 generated, the user can choose to save the planned exercise route as a favorite exercise route in the memory 30 of the personal navigation device 10. In this way, the user can conveniently revisit this exercise route in the future.

Another feature that the personal navigation device 10 can provide is creating an exercise route with planned rest stops to allow the user a chance to rest. The user can select the option of "plan a route with stops" when inputting selected parameters for the exercise route to be created. The user can even be offered the choice of selecting the number of stops to be included on the exercise route when the exercise route is planned for a long distance.

The user can select a variety of input route parameters, each of which is further customizable. Please refer to FIG. 6. FIG. 6 is a screen 200 showing an example of input route parameter preferences selectable by the user. When creating an exercise route, the user may select one or more input route parameter preferences for customizing the type of route the user prefers. In screen 200, several different checkboxes 202, 204, 206, 208, 210, 212, 214, 215, 216 are shown by way of example. Four of the checkboxes 202, 204, 208, 210 have been selected for illustrating which input route parameter preferences are selected by the user when creating a new exercise route. In each case, when one of the input route parameter preferences is selected by the user, the user can be presented with an additional screen corresponding to each individual input route parameter preferences for specifying more detail about the user's input route parameter preferences. A description of each of the input route parameter preferences will be given below.

The difficulty level 202 option can be given a numerical value, such as on a scale of 1 to 5, with 1 being the easiest and 5 being the most difficult. In an embodiment, the difficulty level 202 can be measured by the elevation gain of the exercise route, which can be a net elevation gain (elevation gain minus elevation loss) or can be a gross elevation gain (adding all elevation gains while ignoring elevation loss). In general, the steeper and the more climbing done on an exercise route, the more difficult the exercise route is as compared to flat exercise routes. It will be appreciated that other factors besides elevation gain, such as terrain, can also be used for determining the difficulty level 202.

The exercise type 204 option presents the user with the chance to select one of several different types of exercise. Different exercise types such as walking, running, cycling, and mountain biking can potentially all be done on different types of terrain. For instance, mountain biking can be done using unpaved roads, whereas road cycling will stick to paved roads. By specifying the exercise type 204, the personal navigation device 10 can limit the search for a suitable exercise route to only those that are appropriate for the chosen exercise type 204.

The point of interest 206 option lets the user request that the created exercise route include one or more points of interest selected by the user. If a large number of points of interest are selected or if a whole category of point of interest in a region are selected, then the created exercise route can try to include as many of the points of interest as possible while at the same time satisfying all of the other input route parameter preferences indicated by the user. The points of interest can be chosen from a database or can be points of interest created by the user.

If the user has selected other input route parameters such as distance or starting or ending point, these other selected input route parameters may preclude the routing software 36 from including all points of interest chosen by the user. In this situation, a maximum number of points of interest pertaining to the user's selection will be included. For example, if a user has specified that an exercise route has parameter preferences of a distance of 10 kilometers, a designated starting and ending point, and another parameter preference of seeing as many points of interest within a "Scenic Points" category as possible, the routing software 36 will attempt to fit in as many of the points of interest as possible. If the "Scenic Points" category contains five points of interest in that area, but only three of them can be included in a 10-kilometer route due to the distance constraint, then the routing software 36 will only include those three points of interest in the generated exercise route. On the other hand, when creating an exercise route with no other limiting constraints on the exercise route besides the selected points of interest, then all selected points of interest can be included on the created exercise route.

The total distance 208 option allows the user to limit the created exercise route to one that is approximately a specified distance. The user can also specify any other limitations on the distance, such as less than but not greater than the specified distance, or the distance of the exercise route being within 20% of the specified distance.

The starting and ending point 210 option allows the user to specify one or both of the starting point and the ending point of the exercise route. The starting point can be the same as the ending point of the route or they can be different points. In addition, for instances where the starting point and the ending point are either the same or close to one another, the user can also specify whether there should be any overlap of the departure route and the return route of the exercise route. In other words, the user can specify if any of the route be repeated, or if the departure route and the return route should be different from one another. By choosing a different return route than a departure route, the user can select a complete exercise route having more variety of scenery than if the return route was identical to the departure route. One of the main goals of the present invention is to provide the user with many different options for searching for and creating a customized exercise route so that the exercise route can feel fresh and new to the user, thereby making it more likely that the user will enjoy exercising and continue to use the personal navigation device 10 for creating future exercise routes.

The training program 212 option allows the user to create exercise routes that are consistent with an existing training program that the user is already following and has been entered into the exercise data and preferences 40 portion of memory 30. Based on the results of previous exercise routes that the user has completed, the training program 212 can create an appropriate exercise route for the user on a given day. Using the training program, the user of the personal navigation device 10 receives instructions, suggestions, and motivational encouragement from the personal navigation device 10.

The calories burned 214 option can be used to select an exercise route of an appropriate distance and terrain according to a selected exercise type to ensure that the number of calories that a user burns while exercising on the created exercise route is approximately equal to a specified number. In order to more accurately calculate this value, the user will first have to input various body parameters into the personal navigation device 10 such as the user's height and weight. An exercise route can then be created which aims to enable the user to burn the specified number of calories while exercising.

The heart rate 215 option can be used to select an exercise route of an appropriate distance and terrain according to a selected exercise type to ensure that the user is able to reach a heart rate equal to a value specified by the user. As with the calories burned 214 option disclosed above, in order to more accurately calculate this value, the user will first have to input various body parameters into the personal navigation device 10 such as the user's height and weight and fitness level. An exercise route can then be created which aims to enable the user to reach the selected heart rate.

The direction of route 216 option allows the user to either avoid or use certain geographical directions when the routing software 36 generates the suggested exercise routes. For instance the user may have a reason for selecting or avoiding a certain geographical direction when exercising, such as a strong wind blowing out of a certain direction. If the wind is blowing out of the north, the user may wish to travel on an exercise route that travels only east and west, thereby avoiding travel towards the north. Alternatively, the user may wish to start off the exercise route by traveling north so that the user is heading into the wind while the user still has sufficient energy reserves and then return back to the starting point by traveling south with the wind to the user's back. Instead of considering the wind direction, the user can consider the direction from the user's current position to a specified city or point of interest that the user wishes to travel towards, even if the route does not fully reach the specified city or point of interest. The user can make these selections using the direction of route 216 option.

The input route parameter preferences shown on the screen 200 in FIG. 6 allow the user to filter down search results when the personal navigation device 10 searches for and creates exercise routes. With every exercise route calculation, alternative routes will be created whenever possible. In this way, the user will be able to select a fresh and appealing exercise route while at the same time selecting an exercise route that conforms to the selected input route parameter preferences.

Besides the input route parameter preferences shown in the screen 200 of FIG. 6, any number of other preferences can be specified by the user such as waypoints to be visited on the exercise route, a direction of a city that the route should head towards, a wind direction to use or avoid, a difficulty level of the exercise route in terms of how flat or steep the exercise route is, heart rate to be achieved by the user on the exercise route, calories to be burned by the user on the exercise route, an expected height or an expected elevation gain of the exercise route, preferred points of interest to be visited on the exercise route, starting and ending points that are different from one other, an unspecified ending point being a specific distance away from the starting point, and surface types such as paved, unpaved, cobblestones, and so on.

The GPRS modem 16 allows the personal navigation device 10 to communicate wirelessly with a server via the Internet for accessing a road class database that may be stored in the server. Alternatively, the road class database can be stored in the memory 30 of the personal navigation device 10.

The road class database can provide supplemental information as to which roads are specifically suited for types of exercise such as walking, running, cycling, and mountain biking. The user can create routes on the server using the road class database, and then the created routes can be sent to the personal navigation device 10 via the GPRS modem 16. The use of the road class database hosted on the server allows a larger amount of data to be used for creating exercise routes, and the road class database can be updated constantly for providing the most up to date road data to the user.

A distinguishing feature of the present invention is the use of a "Surprise me" function for surprising the user with automatically generated suggested exercise routes. The user simply needs to indicate the length of the exercise route desired and the routing software 36 of the personal navigation device 10 will automatically generate multiple suggested exercise routes for the user to select from. Once the user selects one of the suggested exercise routes, the routing software 36 prepares navigation instructions for the user to follow the selected exercise route.

Figure 7:
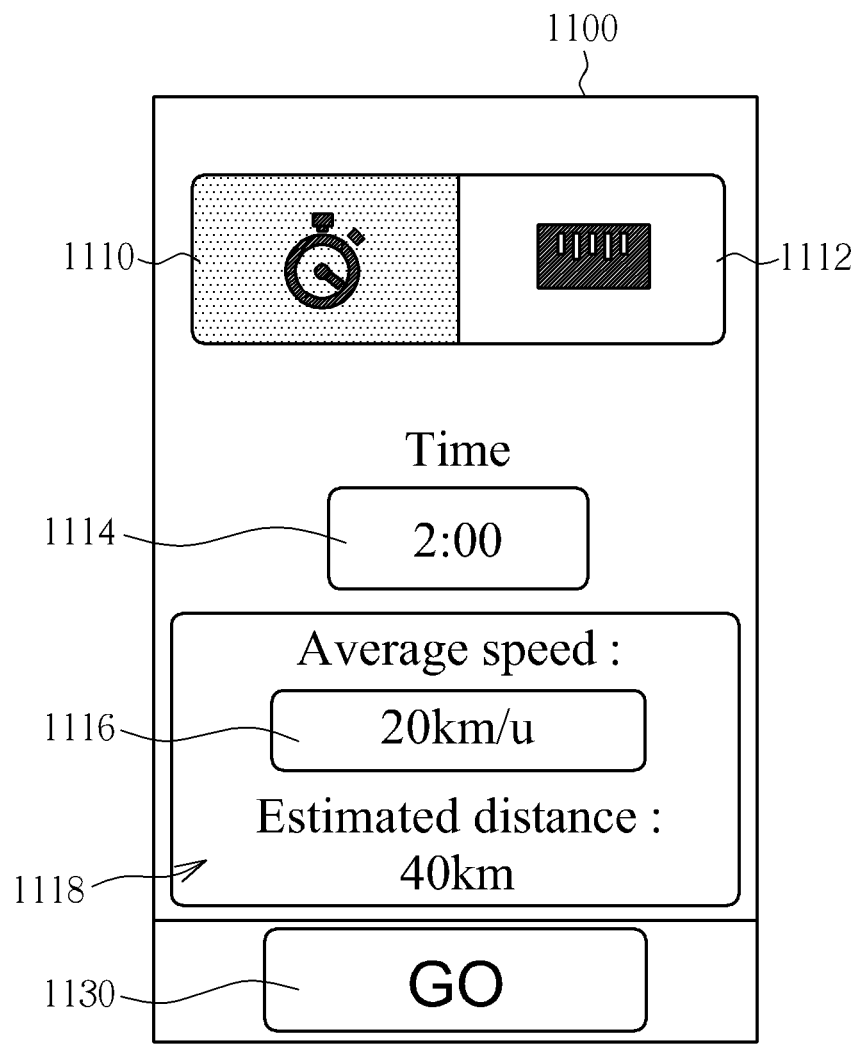
FIG. 7 is a screen showing settings for creating suggested exercise routes with the surprise me function using a combination of exercise time and average speed at which the user will move while exercising.
Figure 10:
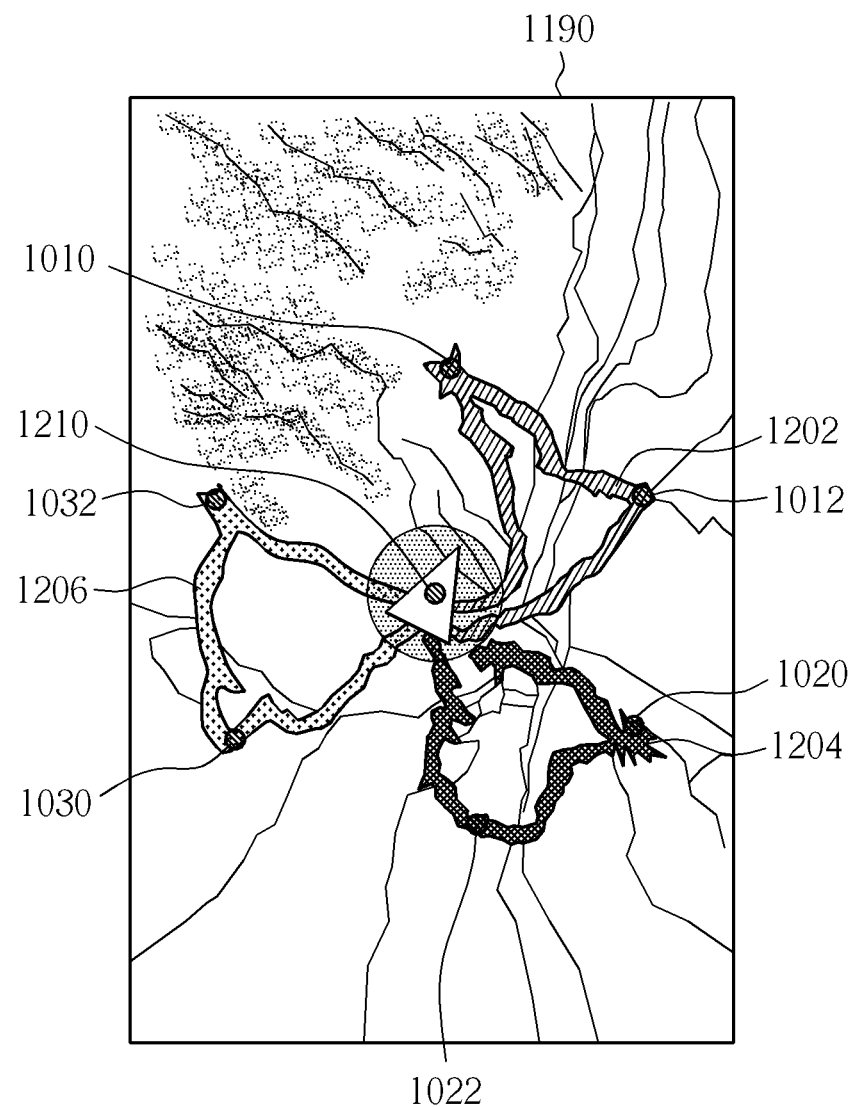
FIG. 10 is a map showing the generated suggested exercise routes.

Please refer to FIG. 7. FIG. 7 is a screen 1100 showing settings for creating suggested exercise routes with the surprise me function using a combination of exercise time and average speed at which the user will move while exercising. The screen 1100 shown in FIG. 10 is a simplified example in which only the exercise time and average speed are entered by the user. Other parameters can be specified by the user instead, and the user can specify one or more of time, distance, waypoints to be visited on the exercise route, a direction of a city that the route should head towards, a wind direction to use or avoid, a difficulty level of the exercise route in terms of how flat or steep the exercise route is, heart rate to be achieved by the user on the exercise route, calories to be burned by the user on the exercise route, an expected height or an expected elevation gain of the exercise route, preferred points of interest to be visited on the exercise route, starting and ending points that are different from one other, an unspecified ending point being a specific distance away from the starting point, and surface types such as paved, unpaved, cobblestones, etc. As shown on the screen 1100, the user has selected a time button 1110 for indicating the route length in terms of an entered exercise time 1114 and entered average speed 1116. The entered average speed 1116 can be automatically filled in for the user based on the user's history of average speeds or the user can manually change the entered average speed 1116 to a different value. For instance, the entered exercise time 1114 shown in FIG. 7 is "2:00". Although the time units are not specified on this screen since they are not strictly necessary, the units could also be displayed for the user or even changed by the user. The entered average speed 1116 shown in FIG. 7 is "20 km/u", meaning 20 kilometers per unit time. Based on these two entered values, an estimated distance 1118 is calculated to be 40 km, meaning that the user would like to generate an exercise route that is 40 kilometers in length.

Figure 8:
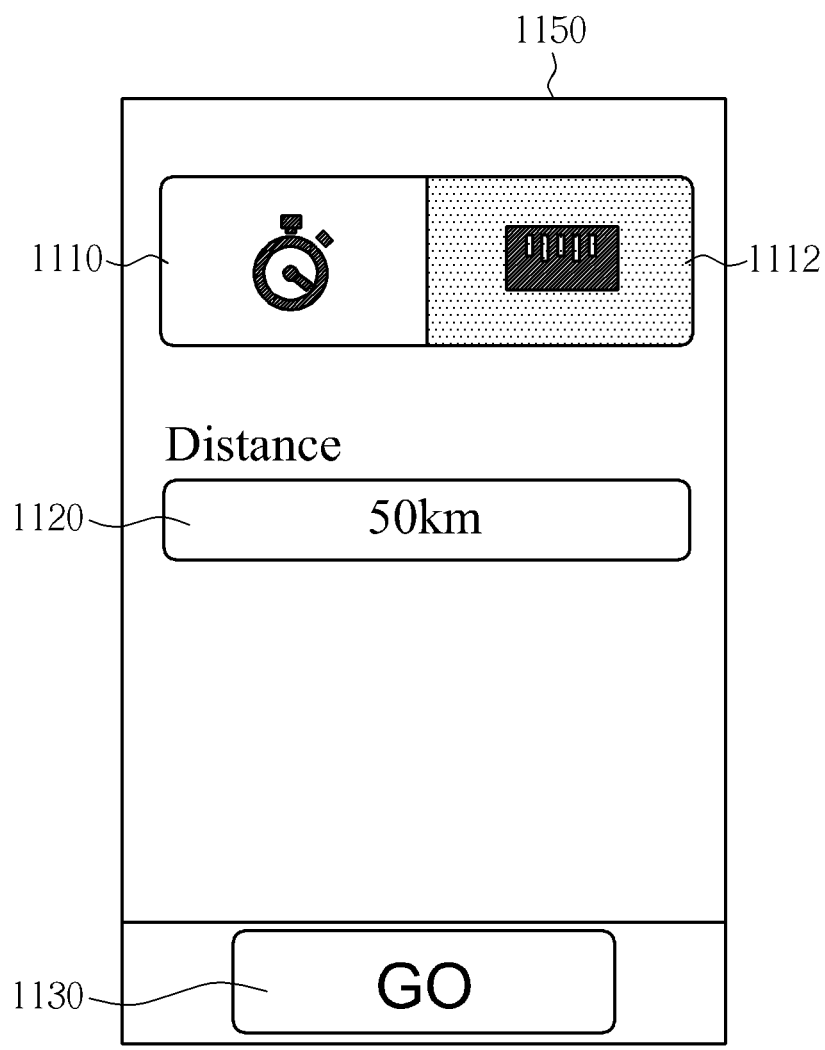
FIG. 8 is a screen showing settings for creating suggested exercise routes with the surprise me function using a distance that the user will travel while exercising.

Please refer to FIG. 7 and FIG. 8. FIG. 8 is a screen 1150 showing settings for creating suggested exercise routes with the surprise me function using a distance that the user will travel while exercising. If the user prefers not to input the route length in terms of the entered exercise time 1114 and the entered average speed 1116, the user can instead press a distance button 1112 for indicating the route length in terms of an entered distance 1120. For instance, the entered distance 1120 shown in FIG. 7 is "50 km", meaning that the user would like to generate an exercise route that is 50 kilometers in length. After the user has input a combination of the entered exercise time 1114 and the entered average speed 1116 or has input the entered distance 1120, the user can press a "GO" button 1130 for indicating that the user has finished indicating the length of the desired exercise route.

Figure 9:
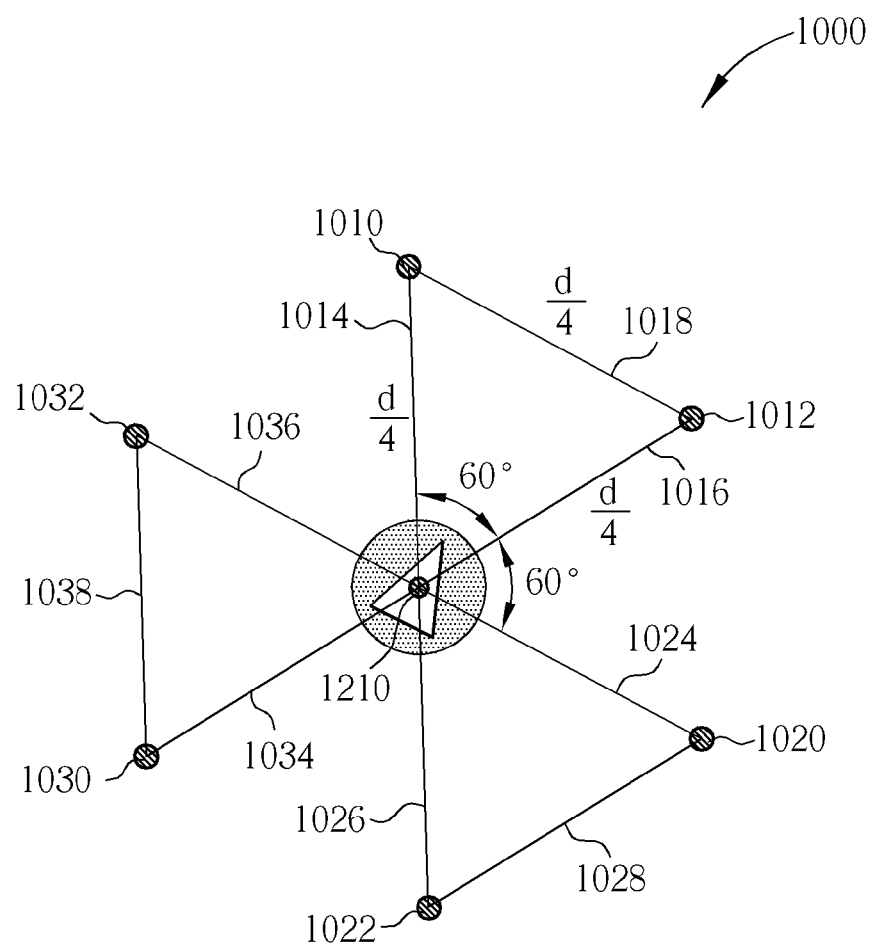
FIG. 9 is a diagram illustrating an algorithm for generating suggested exercise routes according to the surprise me function of the present invention.

Please refer to FIG. 9 and FIG. 10. FIG. 9 is a diagram 1000 illustrating an algorithm for generating suggested exercise routes according to the surprise me function of the present invention. FIG. 10 is a map 1190 showing the generated suggested exercise routes. The diagram 1000 of FIG. 9 contains three triangles, each having a vertex at a current position 1210 of the personal navigation device 10. The three triangles correspond to three different suggested exercise routes 1202, 1204, 1206 displayed on the map 1190. The first triangle, corresponding to suggested exercise route 1202, has three vertices including the current position 1210 of the personal navigation device 10, waypoint 1010, and waypoint 1012. The second triangle, corresponding to suggested exercise route 1204, has three vertices including the current position 1210 of the personal navigation device 10, waypoint 1020, and waypoint 1022. The third triangle, corresponding to suggested exercise route 1206, has three vertices including the current position 1210 of the personal navigation device 10, waypoint 1030, and waypoint 1032.

For each triangle, a distance between each pair of adjacent vertices is equal to approximately d/4, where d represents a total distance of the exercise route to be created. Therefore, a perimeter of each triangle will be equal to approximately 3*d/4, which accounts for three-quarters of the total distance of the exercise route. The remaining quarter of the total distance of the exercise route is accounted for through the various turns and bends that are added to each suggested exercise route. In order to evenly space out each of the three suggested exercise routes 1202, 1204, 1206, an angle of approximately 60 degrees can separate adjacent pairs of waypoints from one another with respect to the current position 1210 of the personal navigation device 10. That is, if an auxiliary line is drawn from the current position 1210 of the personal navigation device 10 to each waypoint, an angle of 60 degrees will separate adjacent auxiliary lines. As shown in FIG. 9, auxiliary lines 1014 and 1016 are drawn between the current position 1210 of the personal navigation device 10 and waypoints 1010 and 1012, respectively. Auxiliary line 1018 is drawn between the waypoints 1010 and 1012. Similarly, auxiliary lines 1024 and 1026 are drawn between the current position 1210 of the personal navigation device 10 and waypoints 1020 and 1022, respectively, while auxiliary line 1028 is drawn between the waypoints 1020 and 1022. In the same manner, auxiliary lines 1034 and 1036 are drawn between the current position 1210 of the personal navigation device 10 and waypoints 1030 and 1032, respectively, while auxiliary line 1038 is drawn between the waypoints 1030 and 1032.

If the user does not like any of the three suggested exercise routes 1202, 1204, 1206 that are generated as part of a first set of suggested exercise routes, the user can request generation of a second set of suggested exercise routes. In order to prevent using the same three suggested exercise routes 1202, 1204, 1206 that were previously generated, new waypoints for a new set of suggested exercise routes can be used that are rotated at an angle including a predetermined angle such as 17 degrees with respect to the current position 1210 of the personal navigation device 10 as compared to the waypoints corresponding to the previous set of suggested exercise routes. In other words, if an auxiliary line is drawn from the current position 1210 of the personal navigation device 10 to each waypoint in the previous set of suggested exercise routes, and an auxiliary line is drawn from the current position 1210 of the personal navigation device 10 in the new set of suggested exercise routes, then an angle between corresponding auxiliary lines in the previous set and the new set of suggested exercise routes would be equal to approximately 17 degrees. The shift in angle between the previous set and the new set of suggested exercise routes can be a predetermined angle or a randomly generated angle.

Please note that each suggested exercise route can have more or fewer than two waypoints used for creating the suggested exercise route. Also, there can be more or fewer than three suggested exercise routes created at one time in a set of suggested exercise routes. Accordingly, other shapes, or even no shape at all, can be used instead of triangles for positioning the waypoints of the suggested exercise routes. Consequently, the distance between each pair of adjacent waypoints can be either shorter or longer than d/4, and the angles between each pair of waypoints can be greater than or less than 60 degrees. Additionally, subsequent sets of suggested exercise routes can be shifted from the previous sets of suggested exercise routes by angles greater than or less than 17 degrees. Furthermore, instead of having the waypoints of the suggested exercise routes being automatically created by the personal navigation device 10, the user can manually enter the waypoints for one or more suggested exercise routes for creating a customized exercise route. The embodiment shown in FIG. 9 and FIG. 10 is provided as an example only, and is not meant to be limiting in any way.

Figure 11:
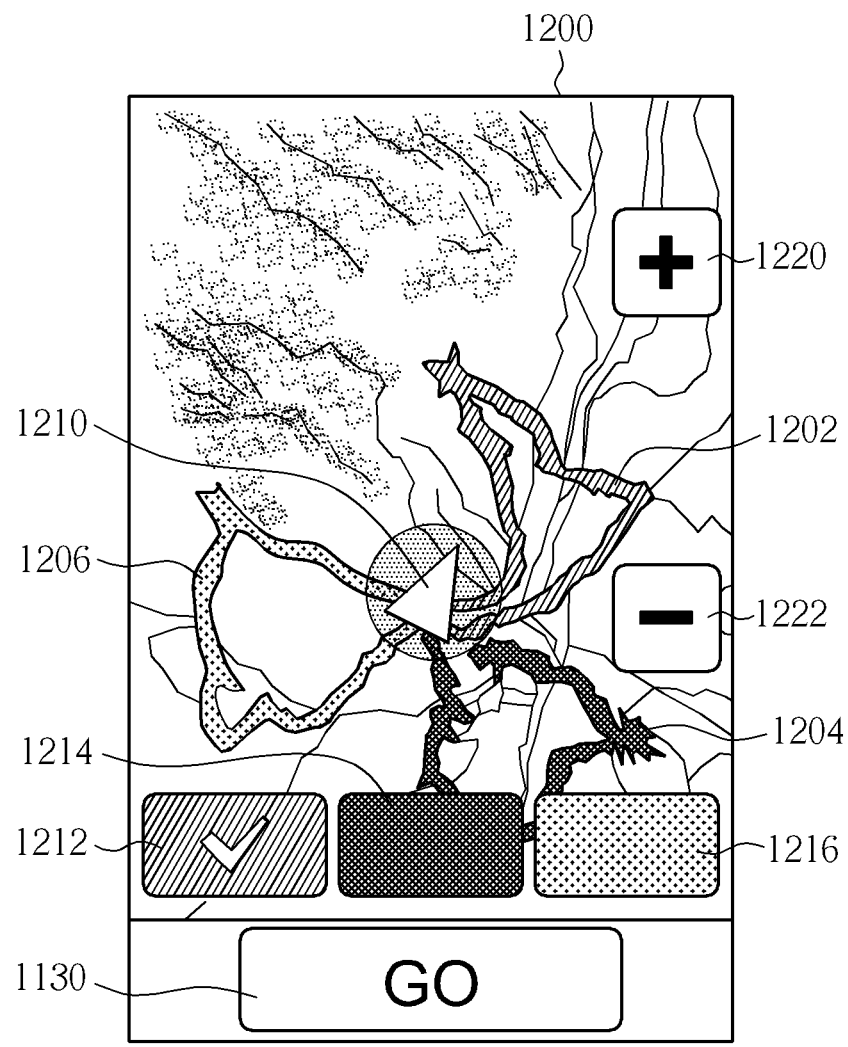
FIG. 11 is a screen showing a map containing three suggested exercise routes displayed on the map for selection by the user.

Please refer to FIG. 11. FIG. 11 is a screen 1200 showing a map containing three suggested exercise routes 1202, 1204, 1206 displayed on the map for selection by the user. After the user presses the "GO" button 1130 in either FIG. 7 or FIG. 8, screen 1200 is shown in the user interface 20 of the personal navigation device 10. Each of the three suggested exercise routes 1202, 1204, 1206 is approximately equal to the length of the exercise route that was previously entered by the user. The three suggested exercise routes 1202, 1204, 1206 preferably all have a starting point and an ending point equal or approximately equal to the current position 1210 of the personal navigation device 10, although one-way routes from a starting point to a different ending point could also be used. As shown on screen 1200, the current position 1210 of the personal navigation device 10 is indicated by a triangle. Other indications for the user's current position 1210 besides the triangle can also be used. Once the user has viewed the three suggested exercise routes 1202, 1204, 1206, the user can select one of the three suggested exercise routes 1202, 1204, 1206 by checking one of the corresponding selection boxes 1212, 1214, 1216. In an embodiment, the selection boxes 1212, 1214, 1216 can also contain the exact distance of the corresponding suggested exercise routes 1202, 1204, 1206. A summary of the suggested exercise routes 1202, 1204, and 1206 can also be provided including height profiles, maximum slopes, average slopes, points of interest on the routes, and so on. For example, as shown in FIG. 11, the selection box 1212 is checked, meaning that the user has selected the suggested exercise route 1202. Once the user has made a selection the user may press the "GO" button 1130 to confirm this selection. If the user does not wish to select any of the three suggested exercise routes 1202, 1204, 1206, the user can simply press a back button on the user interface 20 in order to return to a previous screen such as the screen 1100 or the screen 1150. At that point the "GO" button 1130 can be pressed again to generate another new set of three suggested exercise routes. Other methods can also be used to obtain another set of new suggested exercise routes, including pressing a dedicated button for requesting new exercise routes to be generated. In order to ensure an unlimited number of exercise routes, the present invention strives to present the user with different exercise routes each time the user requests a new set of suggested exercise routes. The present invention will always create different routes so the user can enjoy endless possibilities of exercising.

The user can zoom in or out of the map shown on screen 1200 using a zoom-in button 1220 or a zoom-out button 1222 in order to get a better idea of where the suggested exercise routes 1202, 1204, 1206 lead. Besides zooming, the user can also pan left and right or up and down. If the display 12 is a touch screen then, the zoom and pan functions can be controlled using the touch screen. While screen 1200 shows three suggested exercise routes 1202, 1204, 1206 that have been generated, any number of suggested exercise routes can be generated, including one, two, three, four, or more suggested exercise routes. As long as there are two or more suggested exercise routes, the user will have the ability to select a suggested exercise route that the user prefers from those suggested exercise routes that are displayed at one time.

Figure 12:
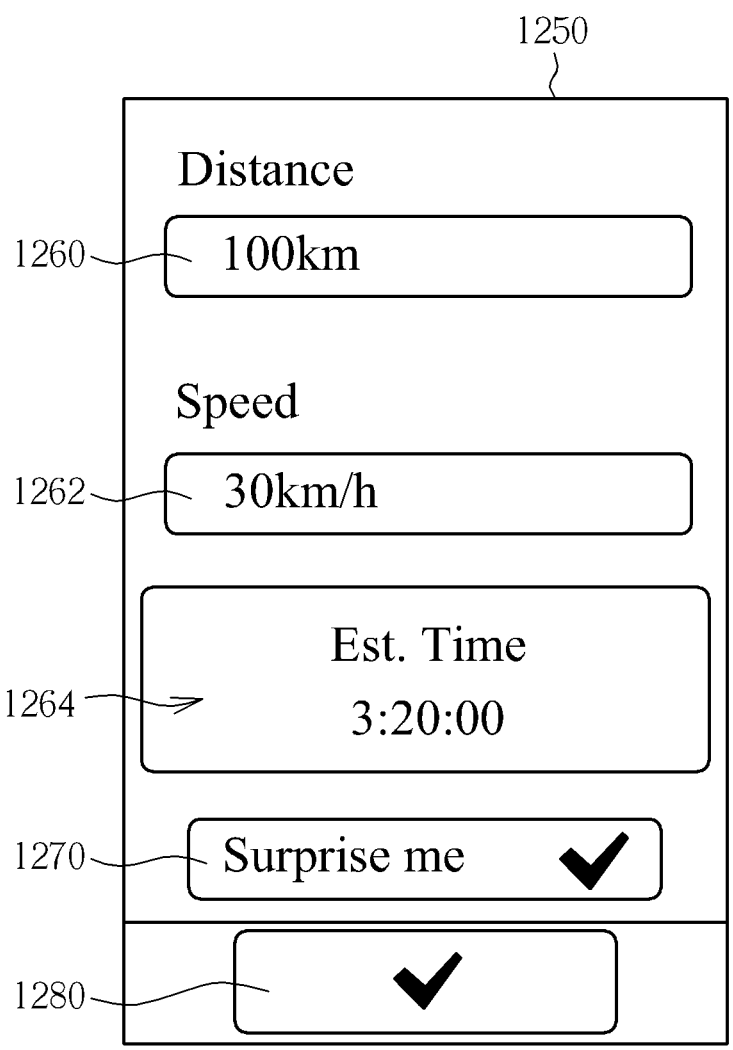
FIG. 12 depicts a workout screen for allowing the user to enter parameters for a desired workout using a combination of distance that the user will travel while exercising and average speed at which the user will move while exercising.

Please refer to FIG. 12. FIG. 12 depicts a workout screen 1250 for allowing the user to enter parameters for a desired workout using a combination of distance that the user will travel while exercising and average speed at which the user will move while exercising. The user can then enter the workout length using an entered distance 1260 and an entered speed 1262. The entered distance 1260 shown in FIG. 12 is "100 km", meaning a total length of 100 kilometers. The entered speed 1262 shown in FIG. 12 is "30 km/h", meaning the user wishes to travel at an average speed of 30 kilometers per hour. Based on these two entered values, an estimated workout time 1264 is calculated to be "3:20:00", meaning 3 hours and 20 minutes. When entering the workout parameters, the user can toggle a surprise me button 1270 for correspondingly enabling or disabling the surprise me function for automatically generating suggested exercise routes. Once all workout parameters have been entered, the user can confirm this selection by pressing a confirm button 1280. When the user uses the workout screen 1250 to generate a workout while enabling the surprise me function for automatically generating suggested exercise routes, the user can be taken to screen 1200 shown in FIG. 11 upon pressing the confirm button 1280 in FIG. 12.

Figure 13:
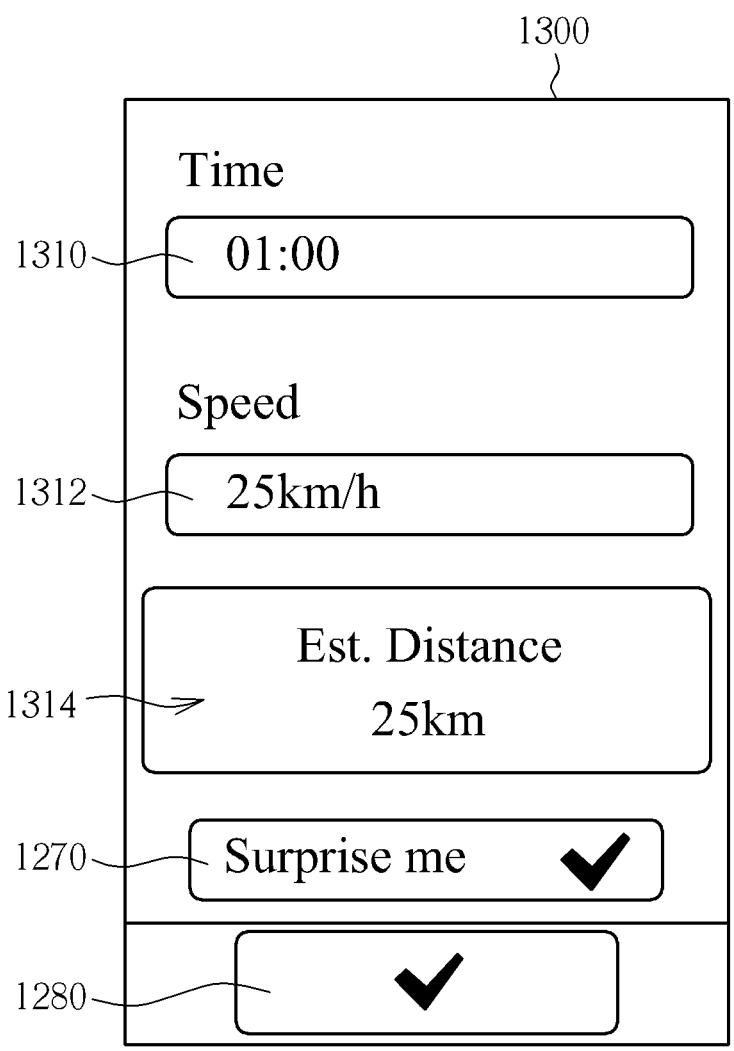
FIG. 13 depicts a workout screen for allowing the user to enter parameters for a desired workout using a combination of exercise time and average speed at which the user will move while exercising.

Please refer to FIG. 13. FIG. 13 depicts a workout screen 1300 for allowing the user to enter parameters for a desired workout using a combination of exercise time and average speed at which the user will move while exercising. The user can then enter the workout length using an entered time 1310 and an entered speed 1312. The entered time 1310 shown in FIG. 13 is "01:00", meaning a total exercise time of one hour. The entered speed 1312 shown in FIG. 13 is "25 km/h", meaning the user wishes to travel at an average speed of 25 kilometers per hour. Based on these two entered values, an estimated workout distance 1314 is calculated to be "25 km", meaning the user will travel over approximately 25 kilometers during the workout. When entering the workout parameters, the user can toggle the surprise me button 1270 for correspondingly enabling or disabling the surprise me function. Once all workout parameters have been entered, the user confirms this selection by pressing the confirm button 1280. When the user uses the workout screen 1300 to generate a workout while enabling the surprise me function for automatically generating suggested exercise routes, the user can be taken to screen 1200 shown in FIG. 11 upon pressing the confirm button 1280 in FIG. 13.

Numbers entered by the user in any of the previous screens 1100, 1150, 1250, and 1300 can be remembered by the personal navigation device 10 so that the user does not need to re-enter the exercise time, average exercise speed, or exercise distance every time a new workout is created. The user will still have the ability to modify these values, but if the user does not wish to make any changes the user can quickly confirm the selection since the numbers will be automatically filled in.

In the event of an emergency, the user can perform emergency communication using the GPRS modem 16 or other similar such modem. The GPRS modem 16 can also be used to communicate with other users, as well as to upload favorite exercise routes via the GPRS modem 16 for sharing the favorite exercise routes on the Internet, and receive training program data from a trainer of the user via the GPRS modem 16. If a group of people is exercising together, members can send messages to other members of the group, and exercise routes can be shared among other group members. Also, exercise routes can also be uploaded to the internet for sharing with a larger number of people.

In summary, the present invention provides a method of automatically creating a plurality of suggested exercise routes for the user of a personal navigation device to select from in order to provide a more enjoyable and varied exercise experience for the user. The plurality of suggested exercise routes can be manually created or can be automatically created for the user based on the user's current location and the length of the exercise route specified by the user. In this way, the user does not need to manually create an exercise route, thereby saving time in planning a route. Further, the user can either select one of the plurality of suggested exercise routes, or the user can request generation of another plurality of suggested exercise routes to choose from. As a result, the user can exercise on a greater variety of exercise routes that are enjoyable and challenging, making it more likely that the user will continue exercising for improving fitness.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of creating an exercise route for a user of a personal navigation device, the method comprising:

storing a database in a memory of the personal navigation device, the database comprising geographic data;

receiving a selection of a length of an exercise route to be generated;

generating a first plurality of suggested exercise routes, each suggested exercise route of the first plurality of suggested exercise routes being generated according to a current position of the personal navigation device, one or more waypoints to be visited along the suggested exercise route, and the selected length of the exercise route, wherein each of the first plurality of suggested exercise routes has a starting point and ending point substantially equal to one another and equal to the current position of the personal navigation device, wherein locations of the one or more waypoints to be visited along each suggested exercise route of the first plurality of suggested exercise routes are automatically calculated by the personal navigation device such that the first plurality of suggested exercise routes are spaced equidistant from one another;

displaying the first plurality of suggested exercise routes to the user on a display of the personal navigation device;

receiving, from the user, selection of a selected suggested exercise route from the first plurality of suggested exercise routes; and displaying routing instructions on the display of the personal navigation device for the selected suggested exercise route.

2. The method of claim 1, wherein each suggested exercise route comprises two waypoints to be visited, a distance from the current position of the personal navigation device to each of the two waypoints being equal to approximately one-fourth of a distance corresponding to the selected length of the exercise route.

3. The method of claim 2, wherein an angle between a first auxiliary line drawn between the current position of the personal navigation device and a first waypoint of the two waypoints and a second auxiliary line drawn between the current position of the personal navigation device and a second waypoint of the two waypoints is equal to approximately 60 degrees.

4. The method of claim 1, wherein after displaying the first plurality of suggested exercise routes to the user on the display of the personal navigation device the method further comprises:

receiving a request from the user to generate a second plurality of suggested exercise routes; and generating the second plurality of suggested exercise routes according to the current position of the personal navigation device, one or more waypoints to be visited along the suggested exercise route, and the selected length of the exercise route in response to receiving the request from the user to generate the second plurality of suggested exercise routes, wherein each of the second plurality of suggested exercise routes has a starting point and ending point substantially equal to one another and equal to the current position of the personal navigation device, and the second plurality of suggested exercise routes are different than the first plurality of exercise routes.

5. The method of claim 4, wherein the one or more waypoints of the second plurality of suggested exercise routes are shifted by a predetermined angle with respect to the one or more waypoints of the first plurality of suggested exercise routes, such that angles between first auxiliary lines drawn between the current position of the personal navigation device and each waypoint of the first plurality of suggested exercise routes and second auxiliary lines drawn between the current position of the personal navigation device and each waypoint of the second plurality of suggested exercise routes is equal to the predetermined angle.

6. The method of claim 5, wherein the predetermined angle is 17 degrees.

7. The method of claim 1, wherein locations of the one or more waypoints to be visited along each suggested exercise route of the first plurality of suggested exercise routes are specified by the user as selected points of interest.

8. The method of claim 7, wherein the selected points of interest are selected as a category of points of interest to be visited along each suggested exercise route, each suggested exercise route being generated in order to visit a maximum number of points of interest included in the category of points of interest.

9. The method of claim 1, wherein the selected length of the exercise route to be generated is indicated by a period of time the user wishes to exercise along with an estimated speed at which the user will travel while exercising.

10. The method of claim 1, wherein the selected length of the exercise route to be generated is indicated by a distance the user wishes to exercise.

11. The method of claim 1, wherein the selected length of the exercise route to be generated is indicated by an amount of calories the user wishes to burn while exercising.

12. The method of claim 1, further comprising receiving, from the user, selection of a type of exercise to be performed on the exercise route, wherein generating the first plurality of suggested exercise routes comprises generating the first plurality of suggested exercise routes according to the selected type of exercise.

13. The method of claim 12, wherein the type of exercise to be performed on the exercise route is selected from the group consisting of walking, running, mountain biking, city biking, and race biking.

14. The method of claim 1, further comprising receiving a selection of a terrain type from the user, wherein generating the first plurality of suggested exercise routes comprises generating the first plurality of suggested exercise routes according to the selected terrain type.

15. The method of claim 1, further comprising receiving a selection of a difficulty level from the user, wherein generating the first plurality of suggested exercise routes comprises generating the first plurality of suggested exercise routes according to the selected difficulty level.

16. The method of claim 1, further comprising receiving a selection of a total elevation gain from the user, wherein generating the first plurality of suggested exercise routes comprises generating the first plurality of suggested exercise routes according to the selected total elevation gain such that the first plurality of suggested exercise routes involve an elevation gain substantially equal to the selected total elevation gain.

17. The method of claim 1, further comprising:

saving a favorite suggested exercise route from the first plurality of suggested exercise routes; and displaying routing instructions for the saved favorite suggested exercise route on the display of the personal navigation device upon receiving selection of the saved favorite suggested exercise route from the user.

18. The method of claim 1, further comprising receiving a rest stop request from the user, wherein generating the first plurality of suggested exercise routes comprises generating the first plurality of suggested exercise routes including one or more rest stops.

* * * * *